JOHN F. TOURTELLOTTE
JOHN F. VILLIERS-FISHER
INVENTORS.

3,733,181
CATALYTIC EXHAUST GAS TREATMENT
APPARATUS
John F. Tourtellotte, Westfield, and John F. Villiers-Fisher, Kendall Park, N.J., assignors to Chemical Construction Corporation, New York, N.Y.
Filed May 14, 1971, Ser. No. 143,401
Int. Cl. F01n 3/14; B01j 9/04
U.S. Cl. 23—288 F      25 Claims

ABSTRACT OF THE DISCLOSURE

An apparatus for catalytically treating the exhaust gas from an engine, so as to eliminate noxious components in the exhaust gas. The apparatus features concentric cylindrical inner and outer catalyst beds, means to pass the engine exhaust gas radially outwards through the beds, and means to inject air into the exhaust gas between the inner and the outer bed, so that catalytic reduction of nitrogen oxides to nitrogen takes place in the inner bed and catalytic oxidation of hydrocarbons and carbon monoxide to water vapor and carbon dioxide takes place in the outer bed.

BACKGROUND OF THE INVENTION

Field of the invention

The invention relates to the prevention of air pollution due to the emission of unburned or thermally degraded hydrocarbons, carbon monoxide and nitrogen oxides in the exhaust gas of engines, such as internal combustion engines as provided for vehicles such as automobiles, trucks, buses, tractors and motorcycles, or the like. In recent years it has been recognized that the exhaust gas discharged from internal combustion engines is a serious source of air pollution, especially in metropolitan areas. In some areas a so-called smog is generated due to atmospheric inversions and accumulation of such exhaust gases in the atmosphere. Recent attempts to prevent such air pollution have concentrated on the destruction or elimination of noxious components by catalysis, especially by admixture of secondary air into the exhaust gas after initial catalytic reduction of nitrogen oxides, followed by catalytic oxidation of residual hydrocarbons, carbon monoxide, etc., in various types of apparatus or catalytic mufflers especially designed for this purpose.

The invention relates particularly to catalytic exhaust gas treatment apparatus in which air is added to the exhaust gas, and the resulting mixture is passed through a catalyst bed to catalytically oxidize noxious unburned or thermally degraded hydrocarbon vapors or other organic vapors to innocuous products such as carbon dioxide and water vapor. The term hydrocarbons will be understood to encompass and include residual unburned hydrocarbons, thermally degraded hydrocarbons and other organic vapors in the exhaust gas stream. The catalytic oxidation procedure, during steady state operation with a hot engine and hot exhaust gas, usually results in the substantial elimination of these deleterious components initially present in the exhaust gas from external or internal combustion engines such as jet engines, gas turbines, diesel engines or gasoline-burning automobile, bus and truck engines, so as to prevent the discharge of these noxious components including unburned hydrocarbons, other organic vapors and carbon monoxide into the atmosphere, and thereby prevent air pollution.

Description of the prior art

Numerous catalysts, catalytic devices and mufflers, and treatment systems have been proposed for the processing of exhaust gas emitted by engines, so as to control engine exhaust emissions and prevent the discharge of noxious components into the atmosphere. Among the many patents relating to catalysis and catalytic formulations may be mention U.S. Pats. Nos. 3,053,773, 3,429,656, 3,316,057, 3,398,101, 3,477,893 and 3,476,508 and U.S. patent applications Nos. 55,998 filed July 17, 1970 and 45,576 filed June 11, 1970 now U.S. Pat. No. 3,701,822. Apparatus for carrying out the procedure are described in U.S. Pats. Nos. 3,380,810, 3,325,256, 3,255,123, 3,222,140, 3,186,806, 3,180,712, 3,169,836, 3,168,806, 3,146,073, and 3,086,839 and U.S. patent application No. 33,359 filed Apr. 30, 1970, now U.S. Pat. No. 3,656,915, which described a two-stage apparatus for carrying out the process with interstage air injection.

SUMMARY OF THE INVENTION

In the present invention, an improved apparatus for exhaust gas catalysis is provided, which features two concentric cylindrical catalyst beds. The input engine exhaust gas is passed radially outwards through the inner bed, preferably by passing the gas from the engine through a foraminous central linear pipe disposed along the central axis of the inner bed. The outwardly flowing exhaust gas is catalytically reacted in the inner bed, to reduce the nitrogen oxides to nitrogen by catalytic reaction with carbon monoxide and/or hydrogen and hydrocarbons which may be present in the exhaust gas. Secondary air is added to the gas stream external to the inner bed, and the exhaust gas-air mixture is then passed radially outwards through the outer or oxidizing bed, in which hydrocarbons and carbon monoxide are catalytically oxidized to water vapor and carbon dioxide. The treated gas is now removed from the container in which the beds are mounted.

The apparatus of the present invention provides several salient advantages. The apparatus conserves the heat from the exhaust gases, and the flow of heat is through the beds at all times. External radiation losses are minimized, and the hot gases leaving the system are on the outer side of the apparatus adjacent to the container, hence radiation losses are obtained where wanted. The electric heater provided in a preferred embodiment is designed to accelerate catalytic activity even at cold startup. The preferred air injection arrangement provides the most uniform distribution of secondary air. In addition, uniform distribution of exhaust gas to the catalyst beds is obtained. Finally, the apparatus provides low gas pressure drop and is compact and easy to assemble.

It is an object of the present invention to provide an improved apparatus for the treatment of engine exhaust gas to prevent air pollution.

Another object is to provide an improved apparatus for two-stage catalytic treatment of engine exhaust gas, in which catalytic reduction of nitrogen oxides takes place in the first stage and catalytic oxidation of hydrocarbons and carbon monoxide takes place in the second stage.

A further object is to provide an apparatus for the catalytic treatment of engine exhaust gas which conserves heat and maintains exhaust gas temperature.

An additional object is to provide a two-stage apparatus for exhaust gas treatment by catalysis to eliminate noxious components, in which uniform distribution of exhaust gas and secondary air is attained, with low gas pressure drop.

An object is to provide an apparatus for catalytic exhaust gas treatment which is compact and easy to assemble.

DESCRIPTION OF THE DRAWINGS AND PREFERRED EMBODIMENTS

Referring now to the drawings, FIG. 1 is a sectional elevation view of a preferred embodiment of the invention.

Figure 1:
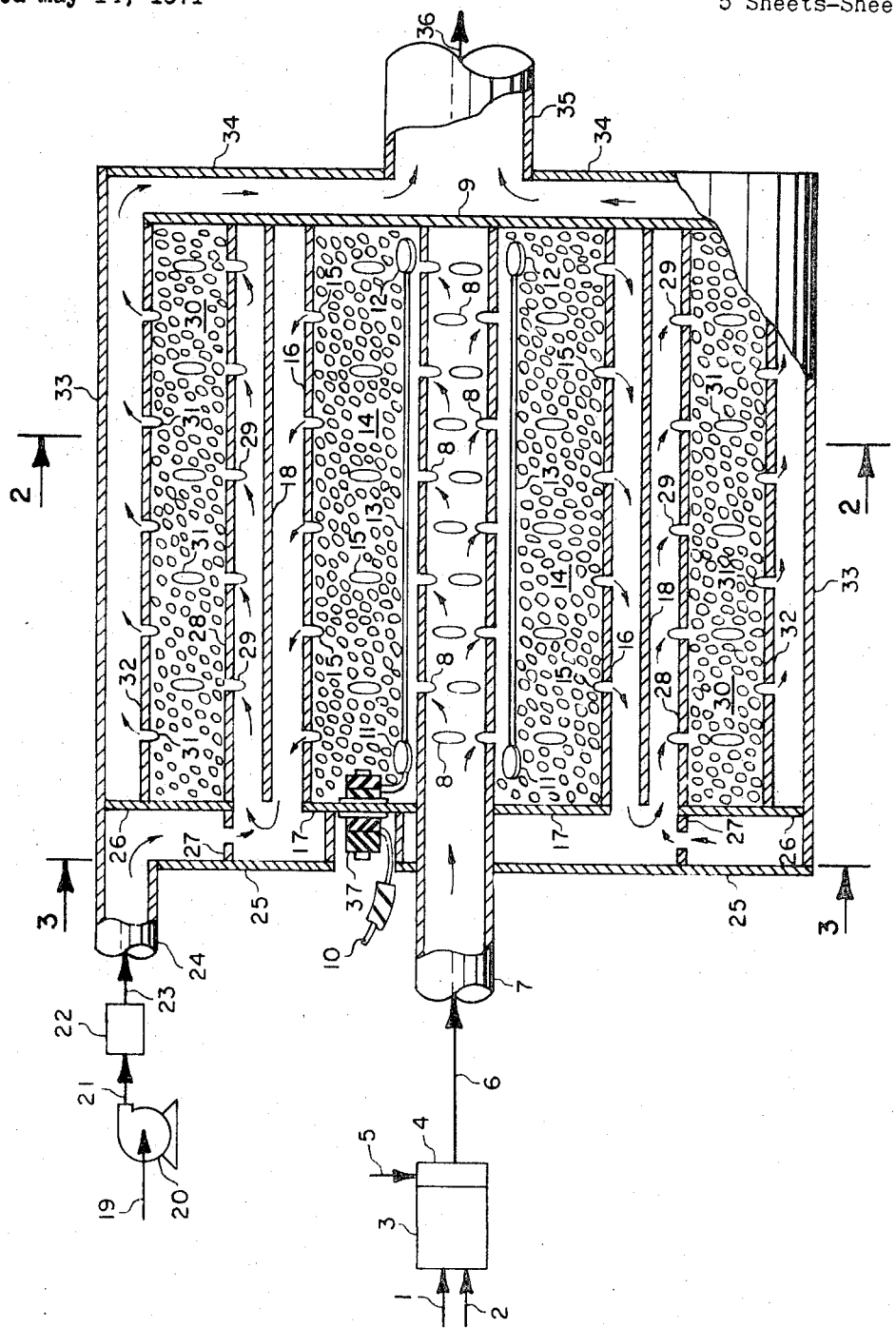

Referring now to FIG. 1, fuel stream 1 which is typically a fluid hydrocarbon fuel such as gasoline, and primary combustion air stream 2, are passed into engine 3, which is typically an internal combustion engine mounted in an automobile or the like. The fuel stream 1 is burned in engine 3 to generate usable power and an engine exhaust gas which is typically collected in exhaust manifold 4. The gas collected in manifold 4 typically contains noxious components including nitrogen oxides, hydrocarbons adn carbon monoxide, and air stream 5 may be injected into manifold 4 in some instances, so that the manifold 4 serves as an afterburner to partially burn hydrocarbon in situ.

In any case, the exhaust gas stream 6 removed from manifold 4 is passed into the central cylindrical pipe 7, which is foraminous and is preferably provided with the plurality of parallel elongated slit openings 8 which are preferably oriented transverse to the central axis of pipe 7. The pipe 7 terminates at circular disc 9, so that the exahust gas flows radically outwards through the openings 8 in the foraminous pipe 7.

The wire or cable 10 extends from a source of electrical potential such as an auto battery, and wire 10 is preferably extended into the device via the insulator coupling 37. A plurality of insulators 11 are disposed in a circular pattern external to pipe 7 adjacent to the gas inlet, and another plurality of insulators 12 are disposed in a circular pattern external to pipe 7 adjacent to disc 9. Resistance wire 13 extends from coupling 37 to insulator 11, and alternately between insulator 11 and 12. At the onset of the engine operating cycle, or during warmup periods of cold engine operation, the gas stream 6 is below optimum catalysis temperatures, and electrical potential is applied to the resistor wires 13 so as to generate a high temperature which heats the gases prior to and during catalysis.

The exhaust gas stream flows radially outwards from pipe 7, and the gas may be heated prior to catalysis by direct contact with wires 13, which also may heat the inner cylindrical catalyst bed 14, which is disposed in an annular fashion external to pipe 7. The nitrogen oxides content of the exhaust gas is selectively reduced to nitrogen in bed 14 by catalytic reaction with carbon monoxide and/or hydrocarbons and hydrogen contained in the exhaust gas. The reaction typically takes place at a temperature in the range of 300° C. to 600° C., and bed 14 consists of discrete particles of any suitable catalyst, catalysts described in the patents enumerated supra. Preferred catalysts include the oxides, salts or reduced oxides of nickel, cobalt, copper and/or manganese or mixtures thereof, deposited on a suitable carrier such as alumina.

The catalytically treated gas, now substantially devoid of nitrogen oxides, passes radially outwards from bed 14 and through the plurality of elongated slit openings 15 in the foraminous cylindrical baffle 16, which is concentrically disposed external to pipe 7 and defines the outer periphery of bed 14, which is also defined by the ring-shaped end baffle 17 in which the connector 37 is mounted. The slit openings 15 are preferably similar in configuration to the openings 8 in pipe 7. The exhaust gas is diverted laterally external to baffle 16 by cylindrical baffle 18, which is concentrically spaced about baffle 16 and extends from disc baffle 9. Baffle 18 terminates at a free end about which the exhaust gas circulates.

A secondary air stream 19 is passed via air pump or blower 20 as stream 21 into optional air preheater 22, which may be provided in some instances to heat the secondary air to a proper temperature for subsequent oxidative catalysis. Unit 22 may provide indirect heat exchange of the air with a suitable hot fluid such as stream 6, final exhaust gas prior to atmospheric discharge, or radiator liquid. In any case, the secondary air discharged from unit 22 via stream 23 passes into inlet pipe 24 which passes the air into the device. The air splits and flows downwards in a circular path between outer substantially circular baffle 25 and inner ring-shaped baffle 26, and inwards through the plurality of openings in the cylindrical baffle 27 which extends between baffles 25 and 26. The secondary air thus joins with and is uniformly mixed into the exhaust gas flowing outwards about the end of baffle 18, and the resulting air-exhaust gas mixture now flows laterally external to baffle 18 into the annular passage defined between baffle 18 and the concentric foraminous cylindrical baffle 28, which is provided with a plurality of elongated slit openings 29 which are preferably similar in configuration and orientation to openings 8 in pipe 7.

The air-exhaust gas mixture flows outwards through openings 29, and radially outwards through the outer cylindrical catalyst bed 30, which is provided with a plurality of discrete particles of an active catalytic agent for the selective oxidation of hydrocarbons and carbon monoxide to water vapor and carbon dioxide. In most instances, the same catalytic agent known as a redox catalyst because of ability to catalyze both reducing and oxidizing reactions, will be provided in both beds 14 and 30. The resulting fully treated exhaust gas discharged radially outwards from bed 30 flows through the plurality of elongated slit openings 31 in the outer concentric cylindrical baffle 32, laterally between baffle 32 and the cylindrical container wall 33, inwards between disc 9 and the circular container end wall 34, and through central outlet pipe 35 for discharge from the device via stream 36.

Figure 2:
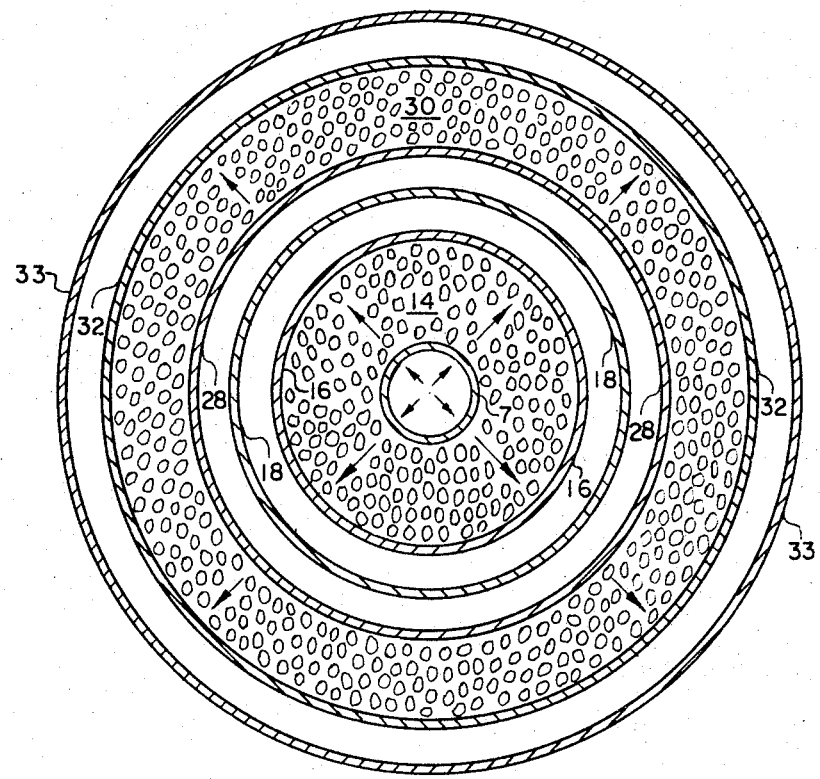
FIG. 2 is a sectional view of FIG. 1 taken on section 2—2 and showing the concentric arrangement of the cylindrical elements.

FIG. 2 is a sectional elevation view of FIG. 1, taken on section 2—2, and shows the concentric circular orientation about a central axis of central pipe 7, bed 14, baffles, 16, 18 and 28, bed 30, and baffles 32 and 33. The radial flow of exhaust gas through the catalyst beds is also shown.

Figure 3:
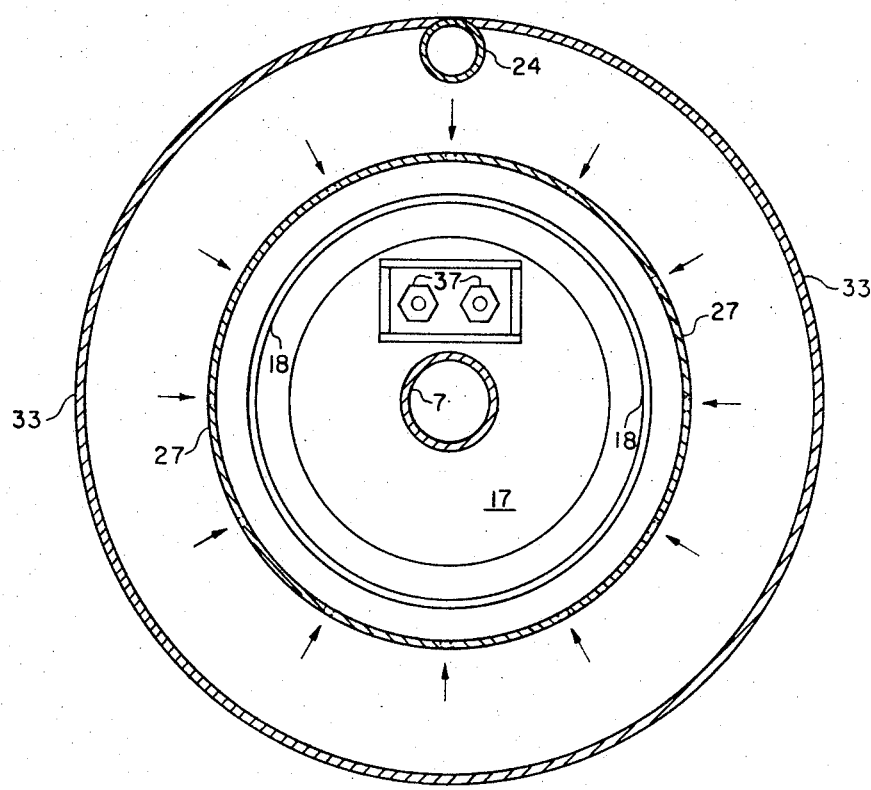
FIG. 3 is a sectional view of FIG. 1 taken on section 3—3 and showing appurtenances at the inlet end of the device.

FIG. 3 is a sectional elevation view of FIG. 1, taken on section 3—3, and shows the orientation of various concentric members as well as the two insulated connector terminals 37, the secondary air inlet pipe 24, and the radial inward flow of secondary air through the openings in foraminous cylindrical baffle 27.

Figure 6:
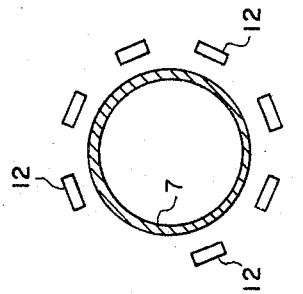
FIGS. 4, 5 and 6 are expanded views of the electric resistor heating element, showing a typical insulator orientation.
Figure 4:
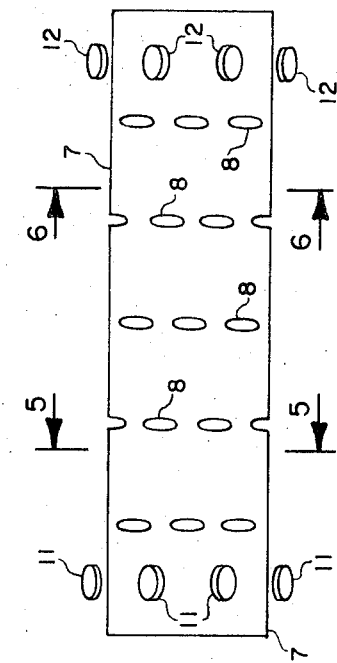
Figure 5:
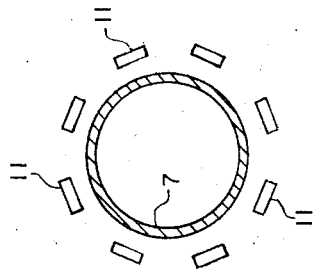

FIG. 4 shows a typical orientation of the plurality of insulators 11 and 12 about the respective ends of pipe 7, and the sectional views of FIG. 4 as shown in FIGS. 5 and 6 show a typical circular orientation of the insulators about pipe 7.

Figure 7:
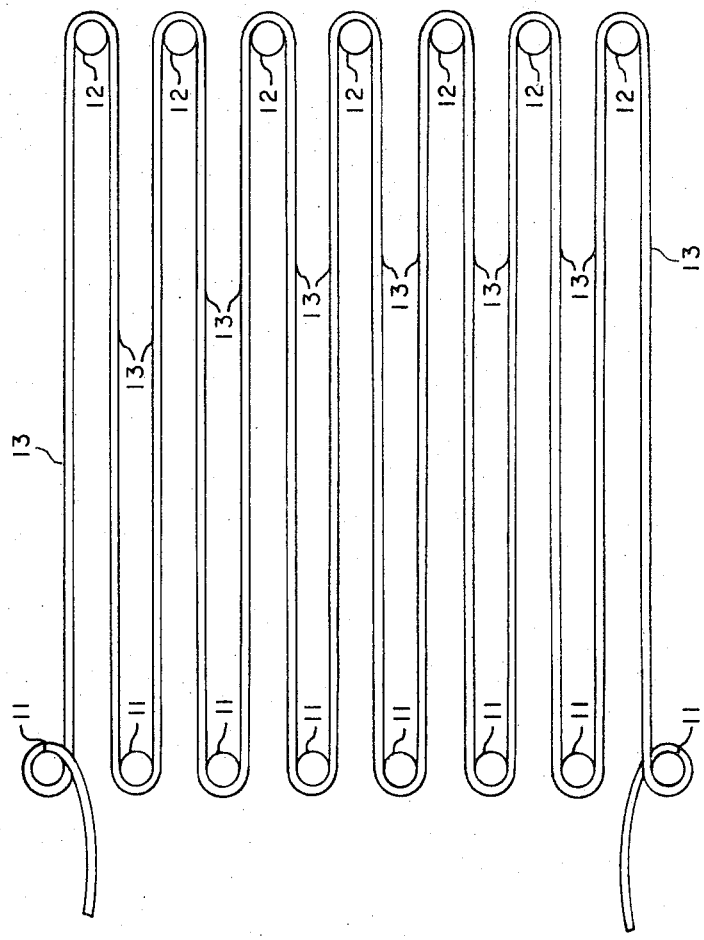
FIG. 7 is a typical wiring diagram of the electric resistor heating element.

FIG. 7 is a typical wiring diagram of the resistor wire 13 extending between alternate insulators 11 and 12. The wire 13 preferably consists of 20 gauge Nichrome 5 wire or other suitable metallic resistor alloy.

Numerous alternatives within the scope of the present invention will occur to those skilled in the art. Thus, the perforations in the pipe 7 and in the foraminous baffles 16, 28 and 32 may be of any suitable configuration and orientation. Stream 5 may be omitted in some instances, such as when the exhaust gas generated by unit 3 is low in unburned hydrocarbons content. The central axis of the device is preferably horizontal or inclined from the horizontal, however the device may also be operated in a vertical position or orientation. Appropriate spacers or the like may be provided between adjacent baffles in practice.

We claim:

1. An apparatus for catalytically treating the exhaust gas from an engine which comprises an inner substantially cylindrical catalyst bed for the catalytic reduction of nitrogen oxides in an engine exhaust gas, an outer substantially cylindrical catalyst bed for the catalytic oxidation of hydrocarbons and carbon monoxide in an engine exhaust gas, said outer bed being coaxial with and concentrically spaced from said inner bed, said inner and outer beds being disposed in a container, means to pass engine exhaust gas radially outwards through said inner bed, an imperforate cylindrical baffle disposed in the annular space between said inner bed and said outer bed, said baffle being coaxial with and spaced from said inner bed and said outer bed, closure means at one end of said baffle to prevent fluid flow, the opposite end of said baffle terminating short of the container wall, whereby engine exhaust gas discharged outwards from said inner bed is diverted laterally between said inner bed and said baffle and towards the opposite end of said baffle, means to inject air into said engine exhaust gas adjacent to the opposite end of said baffle, means to pass the resulting air-engine exhaust gas mixture from the opposite end of said baffle laterally between said baffle and said outer bed, whereby the resulting air-engine exhaust gas mixture flows external to said baffle and radially outwards through said outer bed, and means to remove the treated engine exhaust gas from said container.

2. The apparatus of claim 1, in which said container is cylindrical and concentrically disposed about said outer bed.

3. The apparatus of claim 1, in which said engine is an internal combustion engine.

4. The apparatus of claim 3, in which said internal combustion engine is mounted in a vehicle.

5. The apparatus of claim 1, in which said means to pass engine exhaust gas radially outwards through said inner bed is a central coaxial foraminous pipe within said inner bed, said engine exhaust gas being passed into said pipe and thereafter flowing radially outwards from said pipe into said inner bed.

6. The apparatus of claim 5, in which said foraminous pipe is provided with a plurality of parallel elongated slit openings.

7. The apparatus of claim 6, in which said slit openings are oriented substantially transverse to the axis of said pipe.

8. The apparatus of claim 1, in which said inner bed and said outer bed are each defined by an inner cylindrical foraminous baffle and an outer cylindrical foraminous baffle, said baffles being coaxial and concentric.

9. The apparatus of claim 8, in which said foraminous baffles are provided with a plurality of parallel elongated slit openings.

10. The apparatus of claim 9, in which said slit openings are oriented substantially transverse to the axis of said concentric cylindrical baffles.

11. The apparatus of claim 1, in which said inner bed is provided with internal heating means.

12. The apparatus of claim 11, in which said heating means is an electrical resistor element.

13. The apparatus of claim 12, in which said electrical resistor element is in the form of a plurality of substantially parallel resistor wires spaced parallel to the axis of said inner bed and within the gas inlet portion of said inner bed.

14. The apparatus of claim 13, in which said plurality of parallel resistor wires are disposed in a cylindrical pattern.

15. The apparatus of claim 13, in which said plurality of parallel resistor wires are connected in series, with the end wires of the series being connected to a source of electrical potential.

16. An apparatus for catalytically treating the exhaust gas from an engine which comprises a foraminous cylindrical pipe, means to pass an exhaust gas from an engine into said pipe, said exhaust gas containing noxious components including nitrogen oxides, hydrocarbons and carbon monoxide, a first cylindrical baffle, said first baffle being foraminous and coaxial with said pipe and concentrically spaced about said pipe, said pipe and said first baffle terminating in contact with a circular imperforate disc, a first catalyst bed, said first bed being disposed in the annular space between said pipe and said first baffle and containing discrete particles of an active catalyst for the reduction of nitrogen oxides to nitrogen, whereby said exhaust gas flows radially outwards from said pipe and through said first catalyst bed and nitrogen oxides are reduced to nitrogen, a second cylindrical baffle, said second baffle being imperforate and coaxial with said pipe and concentrically spaced about said first baffle, one end of said second baffle extending from contact with said circular disc, whereby exhaust gas flowing radially outwards from said first catalyst bed and through the plurality of openings in said foraminous first baffle is diverted laterally away from said circular disc in the annular passage between said first baffle and said second baffle, means to add air to said exhaust gas adjacent to the other end of said second baffle, said other end being spaced away from said circular disc, a third cylindrical baffle, said third baffle being foraminous and coaxial with said pipe and concentrically spaced about said second baffle, whereby the air-exhaust gas mixture formed adjacent to the other end of said second baffle flows laterally inwards towards said circular disc in the annular passage between said second baffle and said third baffle, a fourth cylindrical baffle, said fourth baffle being foraminous and coaxial with said pipe and concentrically spaced about said third baffle, a second catalyst bed, said second bed being disposed in the annular space between said third baffle and said fourth baffle and containing discrete particles of an active catalyst for the oxidation of hydrocarbons and carbon monoxide, means closing the ends of said second catalyst bed, whereby the air-exhaust gas mixture flows radially outwards from between said second baffle and said third baffle and through said second catalyst bed, and hydrocarbons and carbon monoxide are oxidized to innocuous oxidation products, a cylindrical container, said container being coaxial with said pipe and concentrically spaced about said fourth baffle, and means to remove catalytically treated exhaust gas from said container.

17. The apparatus of claim 16, in which said engine is an internal combustion engine.

18. The apparatus of claim 17, in which said internal combustion engine is mounted in a vehicle.

19. The apparatus of claim 16, in which said pipe and said foraminous first, third and fourth baffles are each provided with a plurality of elongated slit openings.

20. The apparatus of claim 19, in which said slit openings are oriented substantially transverse to the axis of said pipe.

21. The apparatus of claim 16, in which said first catalyst bed is provided with internal heating means.

22. The apparatus of claim 21, in which said heating means is an electrical resistor element.

23. The apparatus of claim 22, in which said electrical resistor element is in the form of a plurality of substantially parallel resistor wires spaced parallel to the axis of said pipe and within the gas inlet portion of said first catalyst bed.

24. The apparatus of claim 23, in which said plurality of parallel resistor wires are disposed in a cylindrical pattern.

25. The apparatus of claim 23, in which said plurality of parallel resistor wires are connected in series, with the end wires of the series being connected to a source of electrical potential.

References Cited

UNITED STATES PATENTS

| | | | |
|---|---|---|---|
| 2,396,190 | 3/1946 | Morgan et al. | 23—288 F UX |
| 3,086,839 | 4/1963 | Block | 23—288 F X |
| 3,090,677 | 5/1963 | Scheitlin et al. | 23—288 F |
| 3,180,712 | 4/1965 | Hamblin | 23—288 F |
| 3,228,746 | 1/1966 | Howk et al. | 23—2 E |
| 3,380,810 | 4/1968 | Hamblin | 60—299 X |
| 3,544,264 | 12/1970 | Hardison | 23—2 E |

FOREIGN PATENTS

| | | | |
|---|---|---|---|
| 436,331 | 10/1935 | Great Britain | 23—2 E |
| 1,014,498 | 12/1965 | Great Britain | 23—288 F |

BARRY S. RICHMAN, Primary Examiner

U.S. Cl. X.R.

23—288 J; 60—300, 301; 423—213